(12) United States Patent
Bicking et al.

(10) Patent No.: US 6,297,628 B1
(45) Date of Patent: Oct. 2, 2001

(54) MAGNETORESISTIVE BRIDGE ARRAY

(75) Inventors: Robert E. Bicking; Greg R. Furlong; Perry A. Holman, all of Freeport; Ed L. Stern, Lanark, all of IL (US)

(73) Assignee: Honeywell INC, Morristown, NJ (US)

(*) Notice: Subject to any disclaimer, the term of this patent is extended or adjusted under 35 U.S.C. 154(b) by 0 days.

(21) Appl. No.: 09/270,715

(22) Filed: Mar. 17, 1999

Related U.S. Application Data

(60) Provisional application No. 60/108,709, filed on Nov. 17, 1998.

(51) Int. Cl.[7] .................................................. G01B 7/14
(52) U.S. Cl. ........................... 324/207.21; 324/207.12; 324/252
(58) Field of Search ................... 324/207.12, 207.21, 324/207.22, 207.13, 207.24, 207.25, 252, 260, 117 R; 338/32 R

(56) References Cited

U.S. PATENT DOCUMENTS

| | | | |
|---|---|---|---|
| 4,847,584 | * 7/1989 | Pant | 338/32 R |
| 5,208,535 | * 5/1993 | Nakayama et al. | 324/318 |
| 5,243,280 | * 9/1993 | Kusumi | 324/207.22 |
| 5,247,278 | 9/1993 | Pant et al. . | |
| 5,719,494 | * 2/1998 | Detman et al. | 324/117 R |
| 5,820,924 | * 10/1998 | Witcraft et al. | 427/130 |
| 5,952,825 | * 9/1999 | Wan | 324/252 |

FOREIGN PATENT DOCUMENTS

| | | |
|---|---|---|
| 42 08 927 A1 | 9/1992 | (DE) . |
| 0 493 260 | 7/1992 | (EP) . |
| PCT/US99/24878 | 2/2000 | (WO) . |

OTHER PUBLICATIONS

M. Sei, M. Sakakihara, and H. Suzuki: "Durable and Multifunctional Magnetic Rotation Sensor for Rotary Encoders"; *IEEE Transactions on Magnetics*, vol. MAG-23, No. 5; pp. 2185-2187; Sep. 1987.

O. Akiyama and H. Konno, D. Inami, Y. Kuraishi; "Integrated MR Sensors for Automobile"; *IEEE Transactions on Magnetics*, vol. 30, No. 6; pp. 4617-4619; Nov. 1994.

Uwe Dibbern; "Magnetoresistive Sensors"; *Sensors, A Comprehensive Survey*, vol. 5 Magnetic Sensors, Chapter 9 Magnetoresistive sensor, pp. 342-378; published in 1989.

* cited by examiner

*Primary Examiner*—Safet Metjahic
*Assistant Examiner*—Subhash Zaveri
(74) *Attorney, Agent, or Firm*—Roland W. Norris; Andrew A. Abeyta

(57) ABSTRACT

An interleaved parallel MR bridge array is optimized for sensing fine pitch ring magnets and can be utilized to reduce ring magnet target size for wheel speed sensing applications.

24 Claims, 3 Drawing Sheets

MAGNETORESISTIVE BRIDGE ARRAY

CROSS REFERENCE TO RELATED APPLICATION

This Application Claim to Provisional Application No. 60/108,709 filed on Nov. 17, 1998.

BACKGROUND OF THE INVENTION

1. Field of the Invention

The present invention relates generally to the field of magnetically sensitive sensors. The present invention relates particularly to a sensor having a magnetoresistive (MR) bridge array optimized for reading fine pitch ring magnets with high air gap at low gauss levels.

2. Description of the Related Art

MR bridges have been proposed before for sensing ring magnets. For example, see Durable and Multifunctional Magnetic Rotation Sensor for Rotary Encoders, Sei et al., IEEE "Transitions on Magnetics", Vol. mag-23, No. 5, pages 2185–2187, (September 1987), and Integrated MR Sensors for Automobile, Akiyama et al., IEEE "Transactions on Magnetics", Vol. 30, No. 6, pages 4617–4619, November 1994.

However, Applicant is unaware of any practical commercial application of MR bridge and ring magnet which has been optimized for sensing at low gauss and high air gap applications for the sensing of fine pitch, 20 to 50 pole pair, ring magnets. This scenario is particularly important for automobile wheel speed sensing which figures prominently in anti-lock brake systems, anti-slip drive systems, power-assists, and other stability systems on modern automobiles.

SUMMARY OF THE INVENTION

The present invention shows an anisotropic magnetoresistive bridge constructed and arranged of parallel, interleaved bridge elements with dimensions optimized to maximize sensitivity of the sensor at large air gap and low gauss signals in an economically producable package. This is accomplished in a preferred embodiment by matching magnet pole dimensions to the spacing between the array halves to yield a positive and negative going waveform from the MR bridge by passage of a single pole over the array. The sensor can then output a square wave, or single pulse duty cycle, for the passage of each pole over the array. The length, width, thickness and spacing of the individual resistive elements, or runners, as well as their number and arrangement is also disclosed.

BRIEF DESCRIPTION OF THE DRAWINGS

The present invention will be more fully and completely understood from a reading of the Description of the Preferred Embodiment in conjunction with the drawings, in which.

DESCRIPTION OF THE PREFERRED EMBODIMENT

Figure 2:
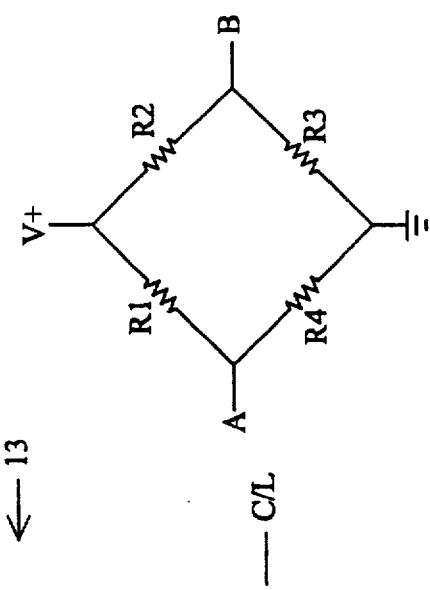
FIG. 2 shows the electrical bridge configuration of the arrangement of FIG. 1.

Throughout the Description of the Preferred Embodiment, like components will be identified by like reference numerals.

Figure 1:
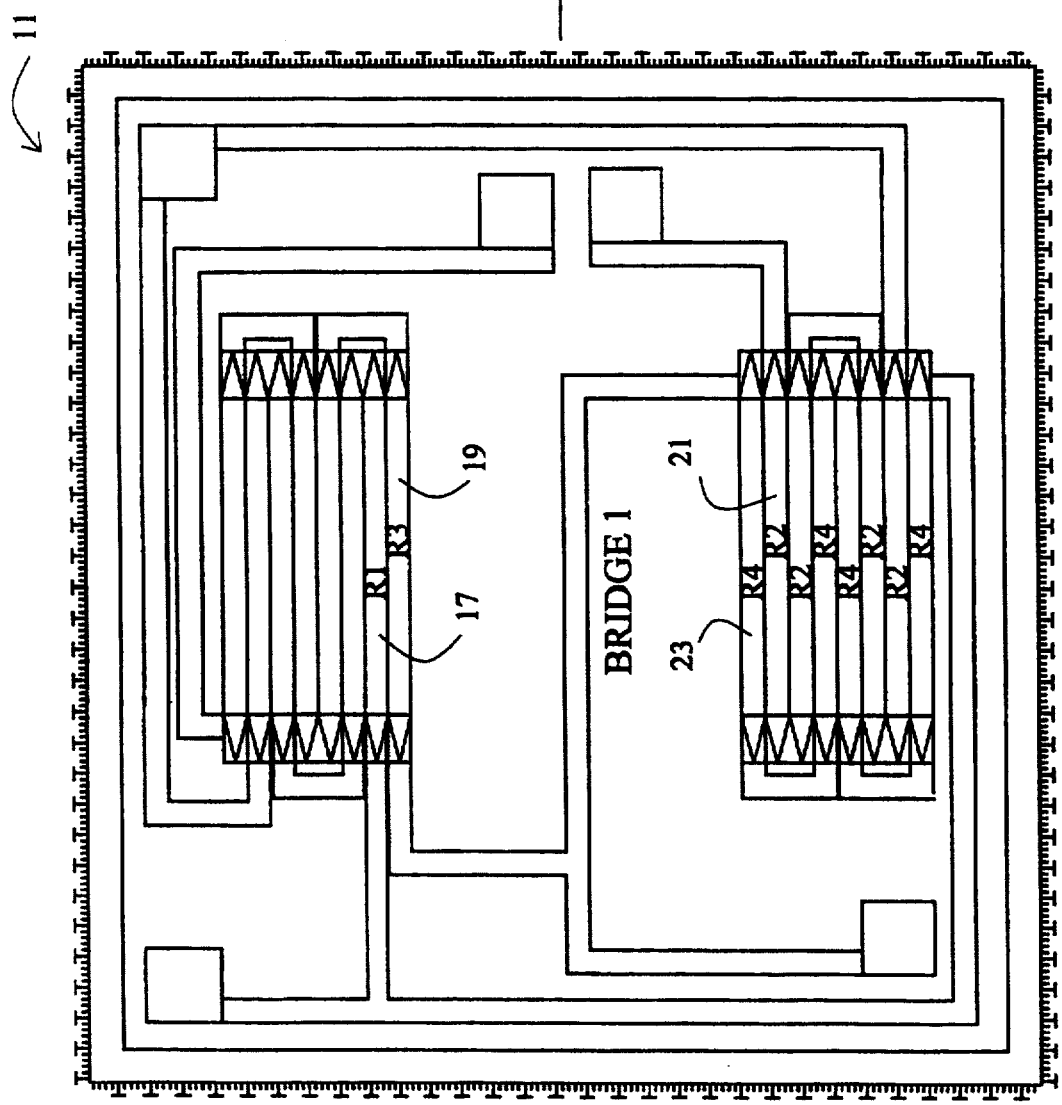
FIG. 1 is a top view of the MR bridge array according to the present invention.
Figure 6:
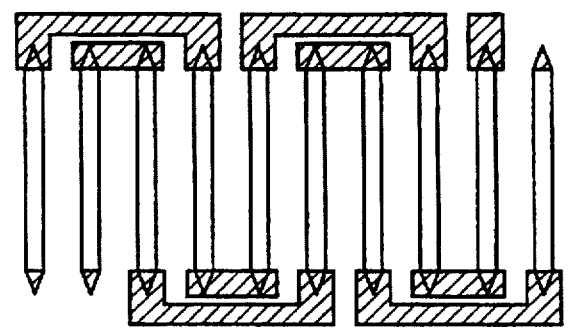
FIG. 6 is an illustration of the interleaving arrangement of an array half having 5 runners per resistive element.
Figure 5:
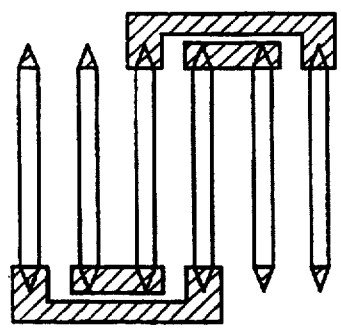
FIG. 5 is an illustration of the interleaving arrangement of an array half having 3 runners per resistive element.
Figure 7:
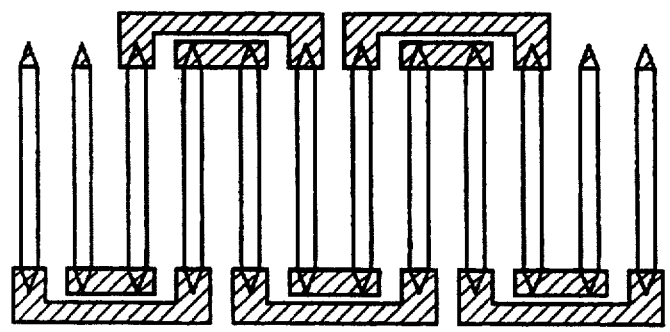
FIG. 7 is an illustration of the interleaving arrangement of an array half having 6 runners per resistive element.

Referencing FIG. 1, an MR bridge 11 is shown to include first and second halves of the array 13 and 15 respectively. The first half 13 includes parallel interleaved bridge resistors R1 and R3, 17 and 19 respectively. Each resistor is made up of multiple runners, or longitudinal elements, shorted together at the ends thereof. The second half 15 is substantially symmetrical with the first half 13 and contains interleaved bridge resistors R2 and R4, 21 and 23 respectively. Each half of the preferred array as shown has an interleaving arrangement of x,2y, 2x,2y, x; where x is a runner of R4 or R3, and y is a runner of R1 or R2. As shown in FIG. 5, where 6 runners are selected, ie three runners per resistive element, a preferred arrangement is x,2y,2x,y. As shown in FIG. 6, a five runner per resistive element array is suggested as x, 2y, 2x, 2y, 2x, y. As shown in FIG. 7, a six runner per resistive element array is suggested as x,2y,2x,2y,2x,2y,x. While various interleaving schemes may be used, eg. simple x,y interleaving of alternate resistive element runners routing of the resistive tracks may become increasingly complex and result in more difficult processing. Interleaving of the array runners will give a better signal averaging over the relatively large span of the array than a grouping of all one resistive element runners to one side of the array half. The number of runners is optimally selected at between 3 and 6 runners to make up a single resistive element. This results in an optimal array area for signal averaging of the target magnetic field in the fine pitch magnet as specified below. As illustrated with the labeling of each of the eight runners in the second half 15, the four runners constituting R4 consist of one outside runner on each side and two center runners for R4. Two pair of two adjacent runners comprising R2 are interleaved with and surrounded on each side by R4 runners.

The deposition of the bridge runners and surrounding electrical connections on to a silicon substrate, or the like, are considered within the ordinary skill of the art. For example, the permalloy runners may be deposited by the techniques as disclosed in U.S. Pat. No. 5,820,924 to Witcraft et al., of common ownership herewith.

Figure 3:
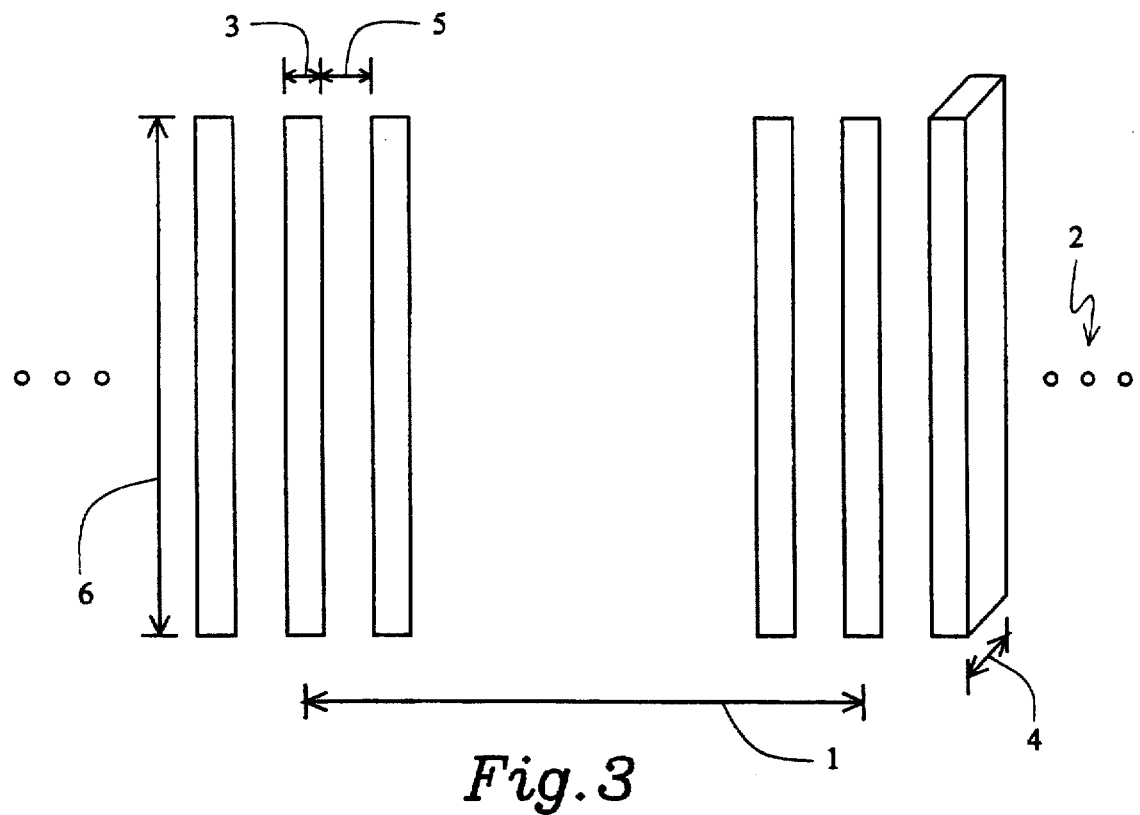
FIG. 3 is a schematic version of the portion of the bridge array utilized for explaining the dimensions thereof.
Figure 4:
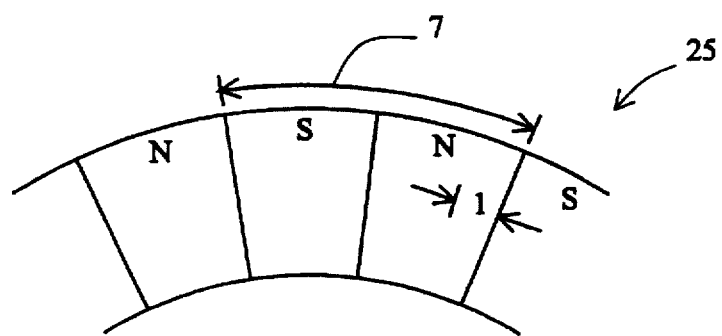
FIG. 4 is a schematic illustration of a portion of a ring magnet utilized in conjunction with the MR bridge array for wheel speed sensing.

Referencing FIG. 3, the major dimensions of the array will be explained. These dimensions are optimized to sense a matched ring magnet 25 such as shown in FIG. 4. This ring magnet 25 would have a pole-pair spacing, or pitch, 7 of about 4.5 mm with a general range of +3.0 mm up to about 7.5 mm for pole pair pitch. This type of magnet would typically be used for wheel speed sensing in automotive applications and, eg., be a fine pitch magnet of about 30–70 mm diameter with about 20–50 pole-pairs included thereon. Because of the physical constraints of the mounting of this magnet for automotive wheel speed sensing applications, a large air-gap between the array and magnet of 3.0 to 3.5 mm is required, meaning that the sensor must switch at low gauss levels of approximately 7 to 8 gauss. For comparison purposes, Honeywell's current Hall sensor part number VF431PP operates with a maximum air-gap of about 1.5 mm at 50–75 gauss and Honeywell's current MR sensor 2SS52M operates at about 2-2.25 mm air-gap at approximately 25±10 gauss.

Returning to FIG. 3, the center-to-center spacing 1 between the first half 13 and second half 15 of the array is on the order of 0.75 to 1.25 mm. This spacing lis preferably selected to match the distance of about 0.5, or half, of a pole face so that a pole transition over the center line of the array will place the first and second array halves on opposite pole faces. In other words, when one array half is over a pole transition, the opposite array half is over the center of a pole face. Because this arrangement results in a full bridge output yielding a high and a low going wave form for each pole face the sensor is able to output a pulse, or duty cycle, for each magnetic pole face on the target. Thus, when compared to previous magnetically sensitive ring magnet sensors which output one sensor pulse per pair of pole faces one may shrink the ring magnet target by half and obtain the same number of output pulses.

The number of runners 2 indicated by dots at each side of the array is selected to be between four and eight runners per resistive element and is preferably six. Multiple runners are selected to gain a length of resistive element suitable to avoid excess current draw through the array, in keeping with optimization of the other dimensions. The runner width 3 is nominally 28 microns and selected to be between 25 and 35 microns. The runner thickness 4 is nominally 175 Å and selected to be between 150 and 250 angstroms. The spacing between runners within the arrays 5 is nominally 3 microns but could be selected to be up to 5 microns. The runner length 6 is nominally 0.76 mm selected to be between 0.5 to 1.0 mm. While all factors in these dimensions are interdependent, it is believed that the stated ranges are the practical limits to satisfy the three major practical constraints of the maximum sensitivity, producability, and reasonable cost for this type of sensor.

As an added benefit, when following the teachings of the present invention for the construction and arrangement of the preferred embodiment of MR sensor array, the present sensing system has an improved insensitivity to run-out, i.e. a condition where the sensor is located more toward the inside or outside diameter of the ring magnet. The present sensor is also less sensitive to large tilt tolerances, up to 10°. Tilt is a condition where the sensing plane of the resistive elements is not perfectly parallel to the face of the ring magnet. By way of comparison, other known types of ring magnet sensors have a tolerance variation for tilt of only 2–3°. Also, the present sensing arrangement is less sensitive to twist, i.e. a condition where the sensing plane is parallel to the ring magnet face, but is turned in that plane so that the bridge runners are not perfectly in parallel with the pole transitions of the ring magnet.

While the present invention has been shown and described with reference to preferred embodiments, many alternatives will become apparent to the ordinarily skilled artisan upon disclosure of the present invention. Therefore the present invention is only to be limited by the claims appended hereto.

Having thus described the invention what is claimed is:

1. A magnetoresistive bridge array comprising:
   a.) first, second, third, and fourth resistive elements, R1–R4 respectively, connected in a bridge electrical configuration on a surface of a silicon substrate;
   b.) each of the first through fourth resistive elements made up of a plurality of longitudinal runners shorted at the ends thereof and whose longitudinal axes are parallel to each other; and
   c.) the array being divided into two halves:
   1) a fist half being composed of interleaved parallel runners R1 and R3,
   2) a second half being composed of interleaved parallel runners of R2 and R4, and
   3) the center to center spacing between array halves is set to be about or equal to 0.5 of a pole face of a ring magnet sensed.

2. The magnetoresistive bridge array of claim 1 wherein:
   there are from 3 to 6 runners for each resistive element.

3. The magnetoresistive bridge array of claim 2 wherein:
   the runners are arranged in an x, 2y, 2x, y, format where x=runner of R4 and R3 and y=runner of R1 and R2.

4. The magnetoresistive bridge array of claim 2 wherein:
   the runners are arranged in an x, 2y, 2x, 2y, x, format where x=runner of R4 and R3 and y=runner of R1 and R2.

5. The magnetoresistive bridge array of claim 2 wherein:
   the runners are arranged in an x, 2y, 2x, 2y, 2x, y format where x=runner of R4 and R3 and y=runner of R1 and R2.

6. The magnetoresistive bridge array of claim 2 wherein:
   the runners are arranged in an x, 2y, 2x, 2y, 2x, 2y, x format where x=runner of R4 and R3 and y=runner of R1 and R2.

7. The magnetoresistive bridge array of claim 1 wherein:
   each runner is from about 25 to about 35 microns wide.

8. The magnetoresistive bridge array of claim 7 wherein:
   each runner is about or equal to 28 microns wide.

9. The magnetoresistive bridge array of claim 1 wherein:
   each runner is from about 150 to about 250 angstroms thick.

10. The magnetoresistive bridge array of claim 9 wherein:
    each runner is about or equal to 175 angstroms thick.

11. The magnetoresistive bridge array of claim 1 wherein:
    there is from about 3 to about 5 microns spacing between adjacent runners.

12. The magnetoresistive bridge array of claim 11 wherein:
    the spacing is about or equal to 3 microns between adjacent runners.

13. The magnetoresistive bridge array of claim 1 wherein:
    the length of each runner is from about 0.5 to about 1.0 mm.

14. The magnetoresistive bridge array of claim 13 wherein:
    the length of each runner is about or equal to 0.76 mm.

15. A magnetoresistive bridge array and ring magnet target comprising:
    a.) first, second, third, and fourth resistive elements, R1–R4 respectively, connected in wheatstone bridge electrical configuration on a surface of a silicon substrate;
    b.) each of the first through fourth resistive element made up of a plurality of longitudinal runners shorted at the ends thereof and whose longitudinal axes are parallel to each other;
    c. ) the array being divided into two halves:
    a fist half being composed of interleaved parallel runners R1 and R3,
    a second half being composed of interleaved parallel runners of R2 and R4;
    d.) a ring magnet of N dimension for each pole face; and
    e.) the array halves having a center to center spacing of 0.5 N.

16. The magnetoresistive bridge array of claim 15 wherein:

there are from 3 to 6 runners for each resistive element.

17. The magnetoresistive bridge array of claim 16 wherein:

the runners are arranged in an x, 2y, 2x, y, format where x=runner of R4 and R3 and y=runner of R1 and R2.

18. The magnetoresistive bridge array of claim 16 wherein:

the runners are arranged in an x, 2y, 2x, 2y, x, format where x=runner of R4 and R3 and y=runner of R1 and R2.

19. The magnetoresistive bridge array of claim 16 wherein:

the runners are arranged in an x, 2y, 2x, 2y, 2x, y format where x=runner of R4 and R3 and y=runner of R1 and R2.

20. The magnetoresistive bridge array of claim 16 wherein:

the runners are arranged in an x, 2y, 2x, 2y, 2x, 2y, x format where x=runner of R4 and R3 and y=runner of R1 and R2.

21. The magnetoresistive bridge array of claim 16 wherein:

each runner is from about 25 to about 35 microns wide.

22. The magnetoresistive bridge array of claim 21 wherein:

each runner is from about 150 to about 250 angstroms thick.

23. The magnetoresistive bridge array of claim 22 wherein:

there is from about 3 to about 5 microns spacing between adjacent runners.

24. The magnetoresistive bridge array of claim 23 wherein:

the length of each runner is from about 0.5 to about 1.0 mm.

* * * * *